United States Patent [19]

Crankshaw

[11] 4,009,771

[45] Mar. 1, 1977

[54] SLIP FRICTION CLUTCH

[75] Inventor: John Crankshaw, Erie, Pa.

[73] Assignee: Dynetics Inc.

[22] Filed: Mar. 17, 1975

[21] Appl. No.: 558,893

[52] U.S. Cl. .................... 192/105 A; 192/58 C; 192/82 T; 192/113 B; 192/109 B
[51] Int. Cl.² ................................ F16D 23/10
[58] Field of Search ......... 192/105 A, 85 F, 113 B, 192/109 A, 109 B, 58 C, 85 AA, 85 A

[56] References Cited

UNITED STATES PATENTS

| | | | |
|---|---|---|---|
| 1,632,526 | 6/1927 | Willgoos | 192/109 B |
| 2,593,521 | 4/1952 | Ball | 192/109 B |
| 3,554,341 | 1/1971 | Anderson | 192/105 A |
| 3,744,608 | 7/1973 | Newman | 192/105 A |

FOREIGN PATENTS OR APPLICATIONS 384,836  12/1932  United Kingdom ........... 192/105 A Primary Examiner—Benjamin W. Wyche

[57] ABSTRACT

The specification discloses a clutch assembly made up of a sleeve and a hub supported on each other for free rotation and being suitable for connecting a drive member to a driven member. The hub and sleeve have friction discs attached to them and the friction discs engage a pressure ring. A supply of oil under pressure is connected to the cavity that receives the clutch plate and when oil is admitted to the friction ring cavity it first fills this cavity then spills over into a cavity containing an actuating piston connected to the pressure ring where the oil forces the actuating piston together with the pressure ring into engagement with the clutch plates thereby forcing them into frictional engagement with each other. A reaction force against the clutch plate is provided by a pressure and adjusting ring from which a reaction force is transmitted to the clutch plate through a Belleville spring. By means of the adjusting ring, the pressure at which the clutch plates will slip can be adjusted.

26 Claims, 4 Drawing Figures

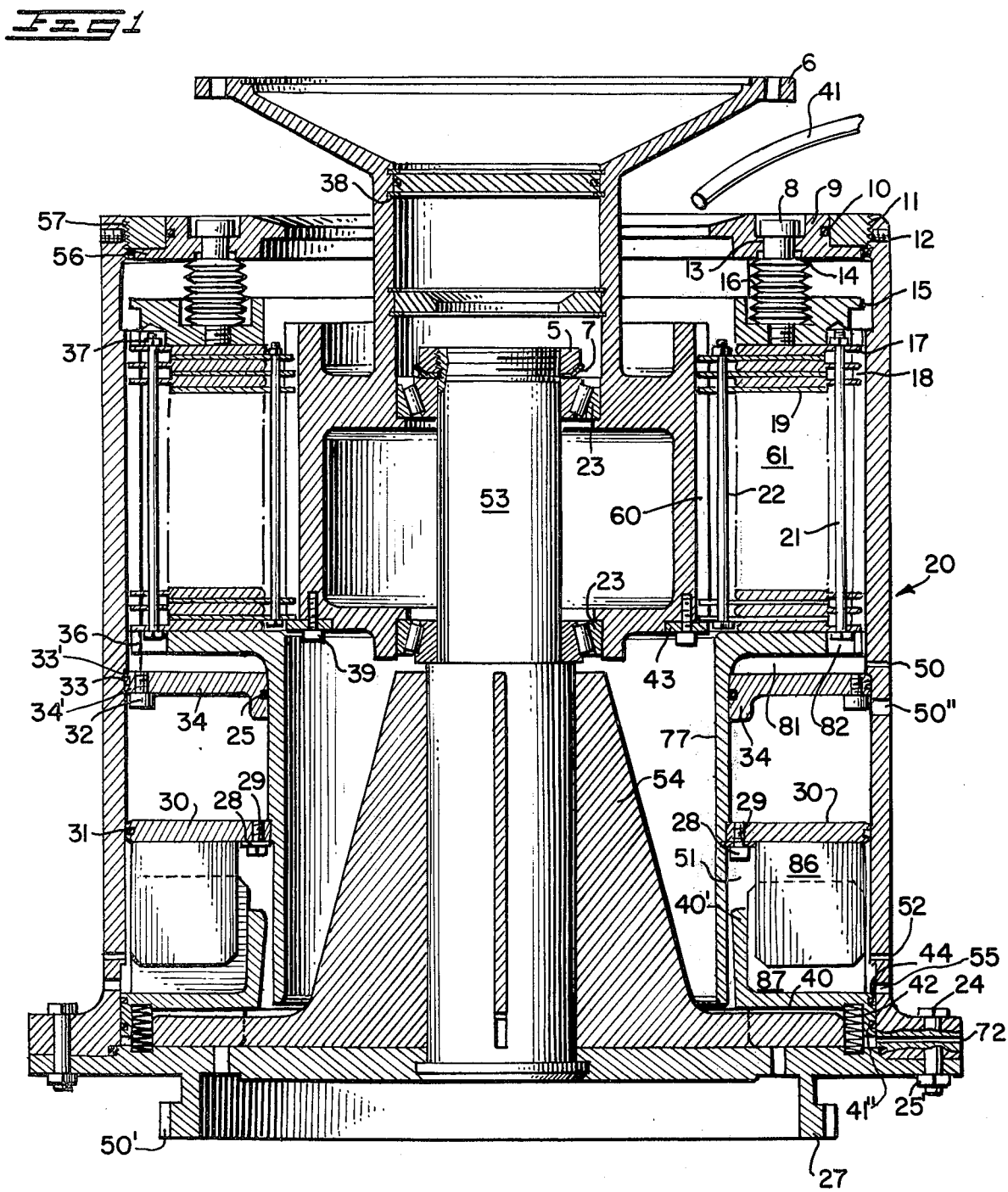

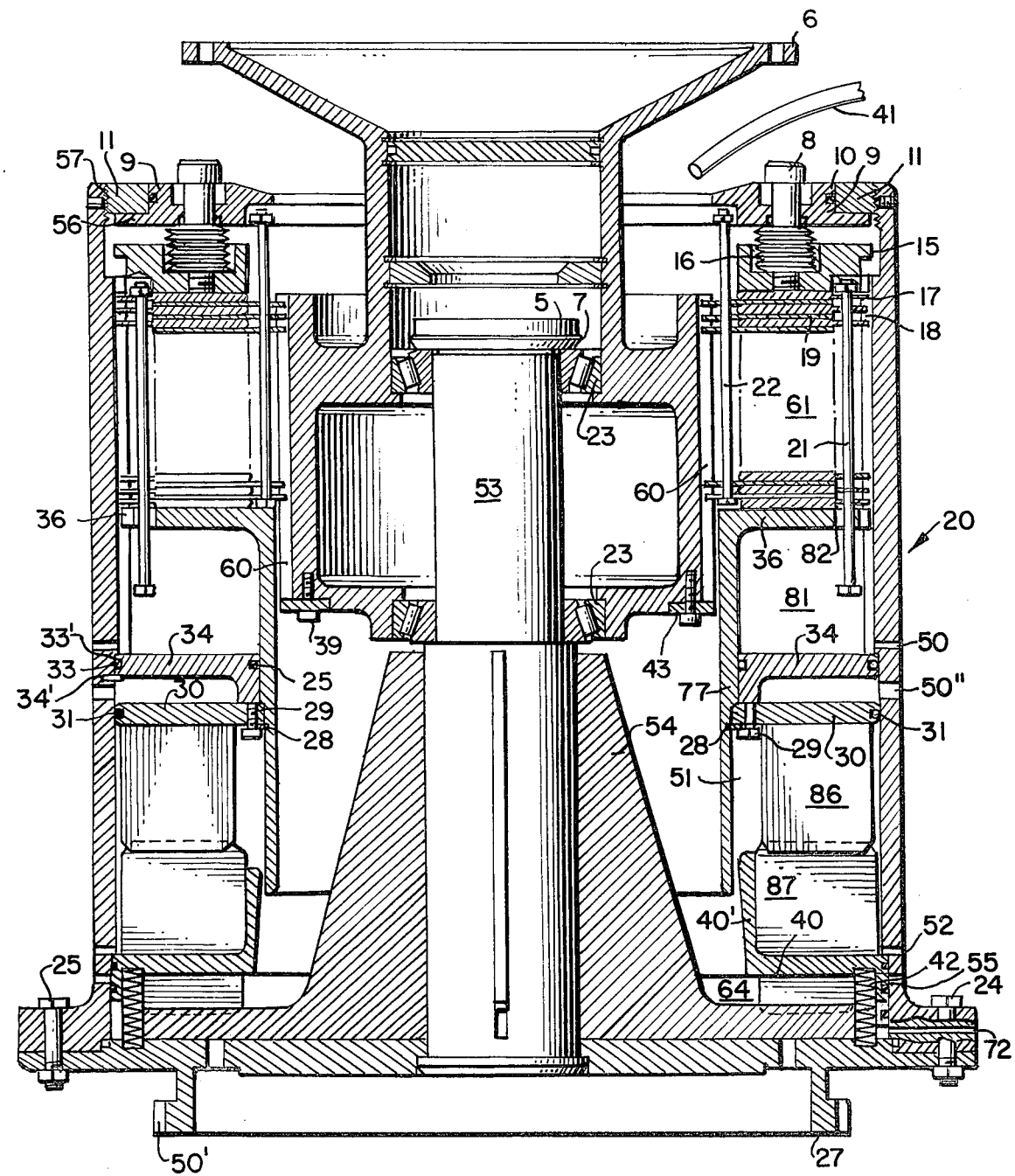

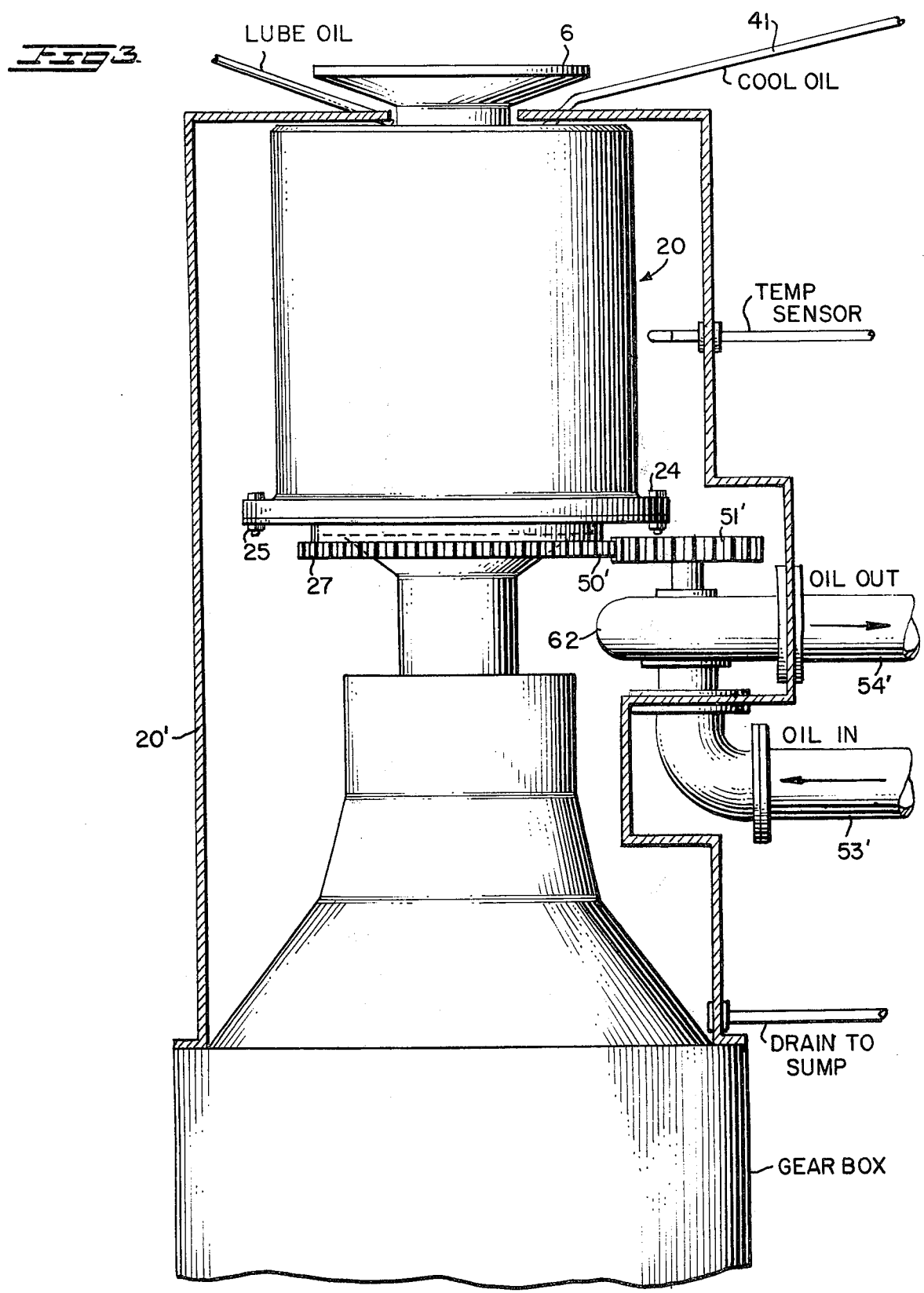

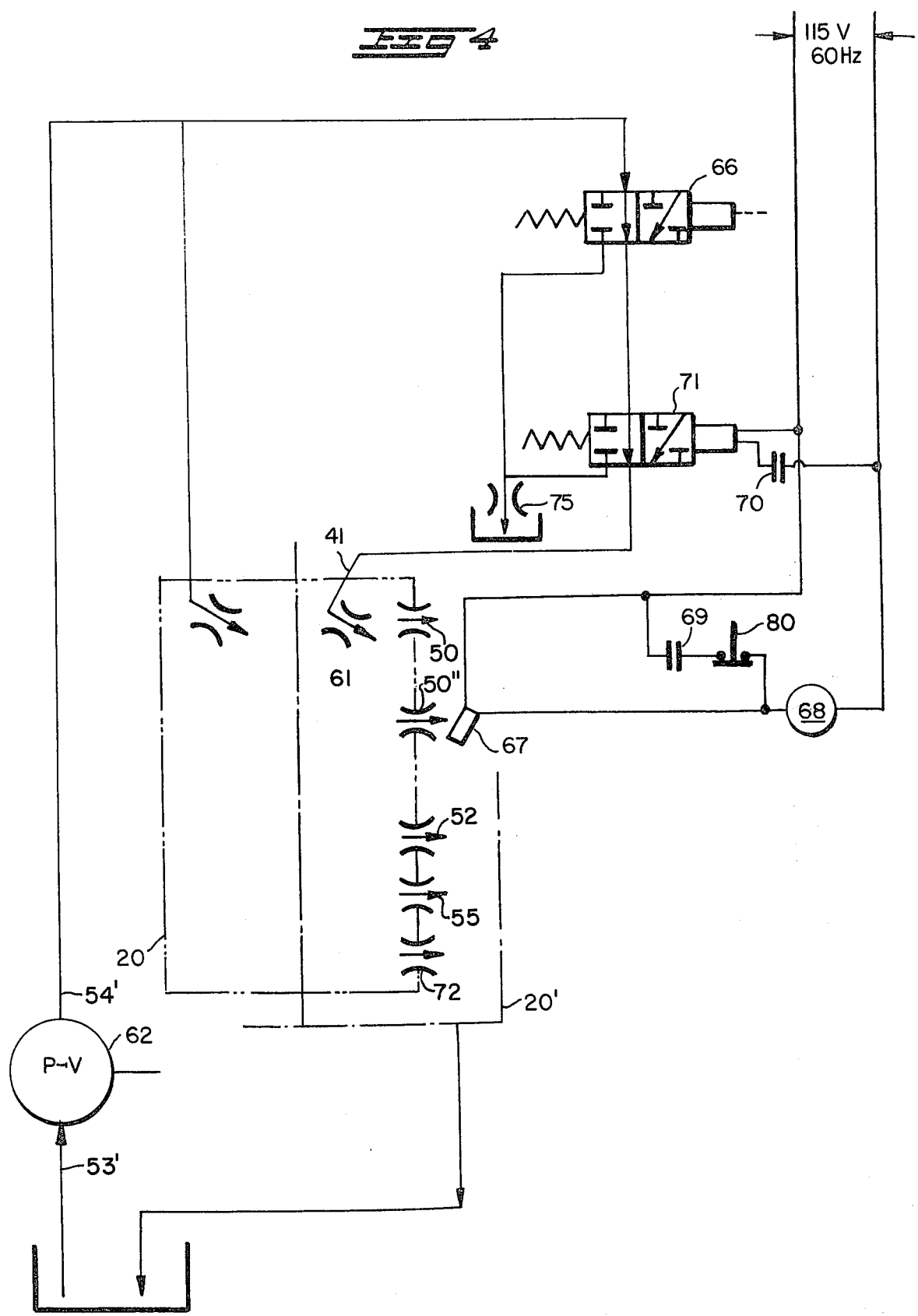

SLIP FRICTION CLUTCH

GENERAL DESCRIPTION OF THE INVENTION

The clutch according to the invention is particularly adapted for use in surface effect ships where lift air is to be provided by prime movers such as gas turbines. The clutch disclosed is suitable to be mounted on the axis of rotation disposed vertically and suitable for transmitting load in the order of five thousand horsepower at speeds of upwards of fifteen hundred rpm. The clutch is automatically disengaged by a thermal sensing means providing protection against damage from overheating and is capable of engaging a fan load at full speeds. The clutch is remotely engagable and disengagable by either hydraulic or pneumatic power. A precise static torque adjustment and a favorable ratio of static dynamic coefficient of friction is provided so that after engagement the friction torque is so controlled as to accept maximum dynamic torque without slip, permit slip before the maximum overload torque is reached and recover from slip with a mimimum magnitude and duration of slip.

With regard to heat generation, when a conventional oil cooled mutiple disc clutch goes into engagement, the following events take place:

As the clearance between friction surfaces decreases, viscous drag increases. The torque so developed is in the direction of reducing slip, and the heat energy generated goes directly into the circulating oil.

When zero clearance is reached, the friction materials are brought into direct contact, and the torque developed is a function of the pressure between the discs, and the wet dynamic coefficient of friction. Heat energy developed in this way is absorbed in both the metal parts and in the oil.

As slip reduces to zero, the torque developed is a function of the pressure between the discs and the wet static coefficient of friction. Since there is no slip, no heat is generated, and the previously heated metal is cooled by the continuous circulation of relatively cool oil.

For engagement times of very short duration (0.1 – 1.0 sec.) heat generation rate, expressed as horsepower per square inch of friction surface can be comparatively high. As engagement time increases, however, the rate of generation must be reduced to prevent vaporization of the oil between the discs, and development of a dry dynamic coefficient of friction which is substantially higher than the wet one.

As total heat generation increases, it is not good enough to base a design on rate of heat generation alone because sustained slip at high HP per square inch produces an unacceptable temperature rise. The design must also consider the maximum heat generated expressed as BTU per square inch of friction surface.

Because of the magnitude of the energy transfer during engagement or slip of the type disclosed, a clutch of reasonable size will have relatively long slip periods, and both HP per square inch and BTU/sq. inch must be considered.

During engagement and periods of slip, heat is generated in the friction surfaces, part of which is absorbed in the metal, and part in the cooling oil. The ratio of oil to metal heat absorbtion increases as the engaging time or rate of slip increases.

Because the slip period is relatively long, and can occur at any time, the cooling capacity required to handle it must be maintained at all times.

This implies a continuous supply of cooling oil at a relatively high rate.

Although it is common to actuate clutches with oil or air under pressure, such systems require seals for transfer from stationery to rotating members. This is accomplished relatively easily when access can be made to the shaft end, otherwise larger and more complicated seals are required for mounting around the shaft.

Because there is no shaft end near the clutch, and because shaft seals add length, and are a potential service problem, overall reliability could be increased if seals of any nature could be avoided.

The clutch according to the invention is engaged by admitting a continuous flow of actuating and cooling oil through the jet indicated and disengaged by turning off the oil supply.

When disengaged, the only contact between input and output elements of the clutch is TIMKEN bearings which are continously lubricated.

As engagement begins, oil first fills the disc cavity before action on the piston, and when disengaging, pressure on the piston is removed before the disc cavity empties. This protects the disc from excessive heat.

The piston moves through a stroke of fixed magnitude and the pressure developed varies as the square of the speed on the input sides. That portion of this pressure that is transmitted to the friction discs and, therefore, the torque at which slip occurs is governed by the adjustment of the adjusting ring at initial assembly.

A thermal switch exposed to the oil draining from the friction disc cavity senses the oil temperature and automatically turns off the oil supply and disengages the clutch when the oil temperature exceeds a pre-determined value. The control system must then be manually reset before the clutch can be re-engaged.

OBJECT OF THE INVENTION

It is an object of the invention to provide an improved friction clutch.

Another object of the invention is to provide a friction clutch that will slip at a predetermined flow.

Another object of the invention is to provide a friction clutch having a slip control and temperature control and is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a longitudinal cross sectional view of the clutch according to the invention shown in disengaged position.

FIG. 2 is a view similar to FIG. 1 showing the clutch engaged position.

FIG. 3 is a side view of the clutch shown connected to a load and connected to an oil pump.

FIG. 4 is a schematic diagram of the controls for the oil supply to the clutch.

DETAILED DESCRIPTION OF THE DRAWING

The clutch may have a gear box supporting the casing 20' which supports the oil pump 62 and surrounds the sleeve 20. The sleeve 20 is driven by the shaft shown connected to the base plate 27 which has the shaft 53 fixed thereto. The gear box shaft rotates the sleeve 20 and the shaft 53 which is concentrically supported inside it.

The hub 6 is rotatably supported on the shaft 53 concentric to the sleeve 20. The discs 17 and 19 are annular members supported between the pressure ring 9 and the support ring 43 and oil intorduced through the pipe 41 can flow down through the spaces between the outer periphery of the discs and the sleeve and between the inner periphery of the discs and the hub 6 into the space around the fins 54.

The hollow cylindrical member 77 supported concentric to the sleeve 20 has the integral annular pressure plate 36 attached to its upper end and the annular actuating piston 30 fixed to an intermediate part by means of studs 29 and rings 28. The actuating piston 30 has an outer peripheral groove, receiving the sealing ring 31 which makes sliding engagement with the inner periphery of the sleeve 20. The oil dam 34 is held in fixed position to the inner periphery of the sleeve 20 by means of the studs 30 and the shoulder 33' and locking ring 34'.

The floating piston 40 has the upwardly directed integrally connected cylindrical flange 40' and the downwardly directed integrally connected cylindrical flange 41'' having the O-rings disposed in outer peripheral grooves which seal and close the opening 55 when the floating piston is lifted by the oil forced under the floating piston 40 by centrifugal force of the fins 54. Oil can flow between the cylindrical flange 40' and the cylindrical member 77 into the space 51 below the actuating piston 32 moving it upward. The fins 86 and 87 rotate with the actuating piston 30 and the floating piston 40 and insures that the oil does not rotate relative to the sleeve 20.

Now with more particular reference to the drawings, the clutch has a sleeve 20 enclosed in cover 20' is provided with a base plate assembly 27 which has an external ring gear 50' which may be connected to a gear 51' to drive an oil pump 62. The oil pump 62 is provided with an inlet 53' and an outlet pipe 54'. The base plate assembly may be connected to a prime mover such as, for instance, a gas turbine, through the gear box shown in FIG. 3. Load end hub 6 may be connected to a load such as a fan. The base plate assembly 27 has the upwardly extending shaft 53 carried by the Timken bearings 23 are locked to the shaft 53 by means of lock nuts 5 and lock washer 7 in a usual manner. Spaced fins 54 fixed to the shaft 53 and extended radially outwardly therefrom carry oil along with them and impart centrifugal force thereto. The sleeve 20 has an outwardly directed flange which is fixed to the base plate 27 by means of bolts 24-25.

The sleeve 20 has internal threads 57 which threadably engage external thread on the adjusting ring 11. The adjusting ring 11 engages the outwardly directed flange 56 on the pressure plate 9. The springs 16 are held to the pressure plate 9 by means of spring plates 15 which is in turn held to pressure plate by socket head shoulder bolts 8. The axial position of the adjusting ring 15 determines the pre-load on the Belleville springs 16 which are located between the pressure plate 9 and the spring plate 15. An O-ring 10 is supported in an external groove in the pressure plate 9 to provide a liquid tight seal between the adjusting ring 11 and the pressure plate 9. Adjusting ring 11 also determines the pressure that can be exerted on the clutch plates by pressure ring 36 at the time piston 30 engages oil dam 34, and is stopped by dam 34. Oil dam 34 has an O-ring 33 in its outer periphery and and O-ring 25' in its inner periphery and is held against the shoulder 33' by snap ring 34'. The socket head screws 8 extend through the pressure plate 9 and into the spring plate 15 and make sliding engagement with the holes in the pressure plate so that the pressure plate 9 and the spring plate 15 can move relative to each other from the position shown in FIG. 1 to the position shown in FIG. 2 thereby compressing the Belleville springs 16.

Below the spring plate 15 is a pre-assembled package of friction discs 17 and 19 loosely held together by bolts 21 and 22 which when the clutch is dis-engaged are separated and supported on the long bolts 21 and 22 and limit the distance that plates 17 and 19 can separate from each other.

The first plates 17 have circumferentially spaced notches that receive the internal circumferentially spaced splines 18 that are integrally attached to the sleeve 20. The second clutch plate 19 has internal slots that receive the external circumferencially spaced splines 60 on the load end hub. The clutch discs freely slide on the splines 18 and 60. The steel clutch discs 19 are engaged on the end remote from the adjusting ring 11 by the pressure ring 36.

A disc support ring 43 is fixed to the load end hub by means of the socket head screws 39 thereby providing a stop for limiting the movement of the discs relative to the hub.

The actuating piston 30 is attached to the lower end of the pressure ring 36. Annular pressure ring 36 is integrally attached to the upper end of cylindrical member 77. Annular actuating piston 30 is fixed to the outer periphery of the cylindrical member 77 at a position spaced from pressure plate 36 by means of member 28 and studs 29. Spaced, downwardly extending plates 86 are fixed to the lower side of actuating piston 30 and plates 86 are received in spaces between upwardly extending plates 87 that are fixed to the floating piston 40.

Annular oil dam 34 is fixed to the inner periphery of sleeve 20 by ring 34' and studs 32. Oil dam 34 has an O-ring 33 in a groove in its outer periphery and and O-ring 25' in a groove on its outer periphery. The oil dam 34 is supported between the actuating piston 30 and the pressure ring 36. The oil dam serves to keep oil contained in the disc cavity 63 and prevent hydraulic pressure from being applied to the upper face of the piston.

The output member is the load end hub 6, supported on the Timken bearings shown, and carrying the steel discs as described above. The Timken bearings permit independent rotation of the input and output elements when the clutch is disengaged or slipping, provide support for the load end elements and establish the free spacing between friction and steel discs in the disengaged position.

The torque at which the clutch will slip is adjusted after assembly but before installation in the ship, and is accomplished by axial positioning of the adjusting ring 11, so that with the piston 30 fully engaged against the oil dam 34, (by a means not shown) and the friction disc cavity saturated with oil, the torque required to rotate the load end hub 6 is within a prescribed limit. When so set, the pressure on the discs is determined by the deflection of the Belleville springs — not by the hydraulic force on the piston 30.

A suggested arrangement for the hydraulic and control system is shown in FIG. 4. Referring to this sketch, each clutch is equipped with a centrifugal pump 62, gear driven from the input sleeve by the gear on base plate assembly 27, so that as the gas turbine starts, oil is immediately supplied to the Timken bearings 23. Two way valve 66 is pilot operated by air from the ship's control system and valve 71 is controlled electrically through the thermal switch 67 which actuates relay 68 and closes its contacts 69 and 70. Both valves 66 and 71 are normally open, and a failure in either the pneumatic or electrical system will leave both valves 66 and 71 open and the clutch in the engaged position.

If the clutch should overheat, the thermal switch 67 acting through the control relay 68, stops pump 62 and thus cuts off the oil supply to the clutch. The oil in the clutch drains out through ports 52, 55 and 72 causing disengagement. The clutch will then not re-engage until a reset switch 80 has been manually depressed.

Assume that the turbine is running, but the clutch is disengaged because the pneumatically operated two-way valve 66 has been energized, bypassing the engaging and cooling oil to drain 75. (A fixed restriction in this line guarantees that some oil with continue to supply the Timken bearings, The clutch engages as follows:

Pilot air to the two-way valve 66 is cut off, the valve 66 shifts to its normally open position shown in FIG. 4, and oil enters the clutch through the jet 41 indicated.

As the disc cavity 63 fills, viscous drag between the clutch plates causes the sleeve 20 to begin rotating the hub 6.

With the disc cavity 61 full, about half the oil escapes through holes 82 to cavity 81 and through the disc cavity drain holes 50 while the rest spills over the inner radius of the pressure ring 36, falls to the bottom of the case and enters the space 64 beneath the floating piston 40. Floating piston 40 is an annular member having an inner peripheral axially extending cylindrical flange 40' integrally attached to its inner edge and a cylindrical axially disposed flange 41" integrally attached to the outer peripheral edge. Spaced outer peripheral grooves are formed in the flange 40" which receive O-rings 44 which make sealing engagement with the inner periphery of the sleeve 20.

The outer periphery of the sleeve 20 has axially spaced openings 50, 50', 53, 55 and 72 therein. Hole 50 drains from the space above the oil dam 34. Hole 50' drains oil from between the actuating piston 30 and the oil dam 34. Hole 53 drains oil from above floating piston 40. Hole 55 drains oil from above floating piston 40 when it has moved down.

Accelerated circumferentially by the radial vanes 54, oil accumulates beneath the floating piston 40 and aided by the springs 42 holds floating piston 40 upward, closing off the drain holes 55.

When the space 64 beneath the floating piston 40 fills, oil then escapes around its inner radius and enters the main piston cavity 51.

As chamber 51 begins to fill, the piston 30 is moved upward, forcing the discs together and increasing the viscous drag and accelerates the fan connected to load end hub 6.

After closing the disc pack, the pressure ring 36 continues its motion, urged by oil pressure of oil in chamber 51 compressing the Belleville springs 16 and full slip friction torque is developed.

When the Belleville springs 16 have been compressed to their pre-set level, the piston ends its stroke and any excess hydraulic pressure is absorbed by the oil dam 34 against which actuating piston 30 stops, as shown in FIG. 2.

As the lift fan accelerates to full speed, slip ceases, and the clutch drives through static friction.

The clutch disengages as follows:

Pilot air is directed to the two-way valve 66, shifting it to cut off the engaging and cooling oil supply to the clutch. With no oil being supplied, the cavity 64 under the floating piston 40 is rapidly discharged through orfice 72. Pressure of the oil above the floating piston depresses it, uncovering the drain holes 55 indicated, the additional drain area exhausts the oil in chamber 51 below the piston 30 very quickly, the pressure ring 36 drops, and the pressure of the Belleville springs 16 separates the friction discs; oil in the disc cavity, being bled more slowly, protects the friction discs during their short period of slipping contact. The clutch is then disengaged.

Normal Slip:

With the system running with the clutch engaged, when sufficient water is ingested to overload the fan attached to base 6, clutch action is as follows:

When applied torque exceeds that for which the clutch was adjusted, it begins to slip and its torque capcity drops by the difference between the static and dynamic coefficient of friction in the discs.

Fan speed drops, reducing its torque demand, until its torque matches the dynamic friction torque capacity of the clutch.

As the water load is cleared, the torque demand of the fan falls below the dynamic torque capacity of the clutch, the excess then acting to accelerate the fan.

If more water is ingested, the cycle is repeated. With the removal of the water load, however, the fan continues to accelerate and, on again reaching full speed, slipping stops at the discs, static friction is restored, andd the system is back to normal.

The amount of oil flow passing through the clutch continuously is sufficient to meet the heat generation rates specified. However, should serious overheating occur, the friction discs would be damaged. Protection against such an event has been provided as follows:

A thermal switch 67 is located in the path of the oil being discharged from the disc cavity. Normally, the oil temperature would not exceed 250° F. However, should repeated slip or some other condition cause the temperature to rise to 300° F., the contacts in the thermal switch 67 would close, energizing the control relay 68. The energizing relay closes contacts 69, locking 68 into the circuit. It closes contacts 70, actuating solenoid operated two-way valve 71, thereby cutting off the supply of actuating and cooling oil to the clutch.

The clutch disengages, the disc cavity empties and the thermal switch contacts open. However, since 68 is locked into the circuit, the clutch remains disengaged. When re-engagement is desired, the reset swtich 80 is depressed momentarily. This de-energizes 68 opening contacts 69 and 70. The two-way valve 71 opens, admitting engaging and cooling oil to the clutch. The clutch re-engages.

Clutch performance characteristics can be varied within certain limits, depending upon friction disc design and rates of oil supply and escape. For preliminary estimating we have assumed an actuating and cooling oil flow of 60 GPM. Based on this flow, and an input speed of 1,670 RPM, the following rough calculated data could be compiled.

For a dead shaft pickup with fan in full pitch it would take approximately 20 seconds to engage the clutch. The maximum rate of heat generation would be 1400 BTU per second, and the total heat generated would be approximately 10,150 BTU. Again, for a dead shaft pickup with fan a full pitch, it would take approximately 3 seconds to disengage the clutch, and approximately 26 seconds to drain the disc cavity after command to disengage.

The foregoing specification sets forth the invention in its preferred practical forms but the structure shown is capable of midification within a range of equivalents without departing from the invention which is to be understood is broadly novel as is commensurate with the appended claims.

The embodiments of the invention in which an exclusive property or privilege is claimed are defined as follows:

1. A clutch comprising,
   a shaft having a sleeve connected thereto,
   a hub rotatably supported on said shaft,
   clutch means comprising first clutch means and second clutch means to be moved into frictional engagement with each other,
   said first clutch means being attached to said sleeve and said second clutch means being attached to said hub,
   enclosing means enclosing said clutch means providing a clutch cavity receiving said clutch means,
   a clutch actuating piston slidably supported on means on said clutch and engaging with said first clutch means and pressure plate means supported on said clutch,
   a spring plate engaging said second clutch means and spring means between said pressure plate and said spring plate means,
   fin means on said sleeve for imparting a centrifugal force to oil,
   and means for introducing oil to said clutch cavity for providing a viscous drag between said first clutch means and said second clutch means whereby a rotational force is transmitted between said shaft and said hub and means connecting said clutch cavity in fluid flow relation with said piston whereby oil from said clutch cavity flows to said fins and centrifugal force is imparted to said oil by said fins moving said oil into engagement with said actuating piston whereby said actuating piston forces said first clutch means and said second clutch means axially toward each other and toward said pressure plate means.

2. The clutch recited in claim 1 wherein the axis of said shaft is disposed vertically and means is provided to preload said springs.

3. The clutch recited in claim 1 wherein said pressure plate means is attached to said sleeve, said spring plate engaging said clutch plate means on the side thereof opposite said actuating piston whereby a reaction force is applied opposite to the force exerted on said clutch means by said piston.

4. The clutch recited in claim 3 wherein said shaft has a backing plate fixed to one end thereof and a sleeve fixed to said backing plate,
   said sleeve being disposed concentric to said shaft,
   said first clutch means is attached to the inner periphery of said sleeve,
   said second clutch means is attached to the outer periphery of said hub.

5. The clutch recited in claim 3 wherein said pressure plate means and said spring means include adjusting means for moving said spring plate means toward and away from said clutch means.

6. The clutch recited in claim 5 wherein oil temperature sensing means in provided for sensing the temperature of oil in said disc cavity,
   said temperature sensing means being adapted to shut off the flow of oil to said clutch cavity whereby the force between said first clutch means and said second clutch means is relieved.

7. The clutch recited in claim 4 wherein said first clutch means and said second clutch means comprise flat discs,
   said first clutch means having notches on the inside thereof slidably received splines on said hub and said second clutch means having notches on the outer periphery slidably engaging axially extending splines on the inner periphery of said sleeve.

8. The clutch recited in claim 7 wherein bolts are slidably supported in holes in said first clutch plates and said second clutch plates comprise first bolts spaced radially inwardly from said second bolts,
   said second bolts having heads passing through a hole in said actuating piston.

9. The clutch recited in claim 4 wherein said pressure plate means comprises an annular pressure plate supported in the end of said sleeve remote from said backing plate,
   an adjusting ring threadably engaging the inner side of said sleeve and engaging said pressure plate means and Belleville washers supported on said pressure plate means engaging said clutch plate means providing said reaction force thereon.

10. The clutch recited in claim 9 wherein said spring plate in a form of an annular ring resting on one of said first clutch discs and spaced openings are formed in said spring plate receiving said Belleville springs.

11. The clutch recited in claim 10 wherein said hub has a blind hole therein receiving the end of said shaft and spaced antifriction bearings are disposed between said hub and said shaft.

12. The clutch recited in claim 7 wherein said piston is in the form of a hollow cylinder supported concentric to said shaft and having an outwardly directed flange and piston ring means on said flange for slidably engaging the innerperiphery of said sleeve and a second flange on said actuating piston spaced from said first flange,
   said second flange engaging said clutch means exerting a force thereon.

13. The clutch recited in claim 12 wherein the end of said piston adjacent said backing plate is spaced from said backing plate and oil can flow from said fins to a space below said first mentioned flange for exerting a force on said piston urging said actuating piston toward said discs.

14. The clutch recited in claim 13 wherein a floating piston is provided, said floating piston comprising an annular member having a first flange in the form of a hollow cylinder concentric to said sleeve and receiving said actuating piston therein, said floating piston having a second flange with piston ring means thereon slidably engaging the inner periphery of said sleeve, and holes in said sleeve, said floating piston being adapted to move over said holes in said sleeve thereby shutting off the flow of oil from said holes in said sleeve when centrifugal force exerted by oil on said floating piston urges said floating piston to move toward said clutch plates.

15. The clutch recited in claim 14 wherein second drain holes are provided in said sleeve below said floating piston whereby all oil is drained from said clutch when the flow of oil to said fins is discontinued.

16. The clutch recited in claim 15 wherein spring means is provided for urging said floating pistons away from said base plate.

17. The clutch recited in claim 16 wherein an oil dam in the form of an annular disc is supported on said sleeve and disposed in the space between said actuating piston and said sleeve, said oil dam has a sealing ring on the inner periphery thereof slidably engaging the outer periphery of said cylindrical part of said actuating piston.

18. The clutch recited in claim 17 wherein an oil drain hole is provided in said sleeve on the side of said oil dam adjacent said clutch whereby oil from the space between said oil dam and second flange of said actuating piston is drained.

19. The clutch recited in claim 18 wherein means is provided on said actuating piston engaging means on said floating piston for preventing relative rotation between said floating piston and said actuating piston.

20. The clutch recited in claim 19 wherein said fins on said shaft have portions thereof extending outwardly between said floating piston and said base plate.

21. The clutch recited in claim 20 wherein said actuating piston has axially extending blade means thereon; and axially extending blade means on said floating piston interfitting with said blade means on said actuating piston for preventing relative rotation between said floating piston and said actuating piston.

22. The clutch recited in claim 20 wherein stop means is provided on the inner periphery of said sleeve for limiting the movement of said actuating piston.

23. The clutch recited in claim 22 wherein said oil dam comprises said stop means for limiting the movement of said actuating piston.

24. A clutch comprising a hub and a sleeve supported on said hub concentric thereto, means to connect said hub and said sleeve between a prime mover and a load, clutch plate means connected to said hub disposed adjacent second clutch plate means on said sleeve, an annular spring plate engaging said clutch plates on a first side thereof, and hydraulic piston means engaging said clutch plates on the side thereof, remote from said spring plate, for urging said clutch plates into frictional engagement with each other, an annular pressure plate disposed concentric to said annular spring plate, and compression springs disposed between said pressure plate and said annular spring plate urging said pressure plate away from said spring plate, headed shoulder bolts extending through holes in said pressure plate and threadably engaging said spring plate, limiting the movement of said pressure plate and said spring plate away from each other, an adjusting ring overlying said pressure plate and having external threads engaging internal threads on said sleeve positioning said pressure plate and said spring plate in said sleeve.

25. The clutch recited in claim 24 wherein said springs are Belleville springs and said adjusting ring is rotatable in said sleeve to adjust the position of said pressure plate relative to said clutch plates.

26. The clutch recited in claim 25 wherein said sleeve has means thereon to direct hydraulic fluid to said piston means by centrifugal force.

* * * * *